United States Patent [19]
Ardis et al.

[11] Patent Number: 5,172,281
[45] Date of Patent: Dec. 15, 1992

[54] VIDEO TRANSCRIPT RETRIEVER

[76] Inventors: Patrick M. Ardis, 4979 Barfield Rd., Memphis, Tenn. 38119; Marko R. Markovich; Kevin W. Thompson, both of 1116 8th St., New Orleans, La. 70115

[21] Appl. No.: 628,082
[22] Filed: Dec. 17, 1990
[51] Int. Cl.$^5$ .................... G11B 27/32; H04N 5/782
[52] U.S. Cl. .................... 360/72.2; 360/33.1; 364/409; 369/14
[58] Field of Search .................... 360/13-14.3, 360/33.1, 72.1-72.3; 395/600, 425, 144, 145; 364/409, 419; 369/14, 15; 358/335

[56] References Cited

U.S. PATENT DOCUMENTS

| | | | |
|---|---|---|---|
| 4,641,203 | 2/1987 | Miller | 360/33.1 |
| 4,924,387 | 5/1990 | Jeppesen | 364/409 |
| 4,941,125 | 7/1990 | Boyne | 395/600 |

OTHER PUBLICATIONS

SMPTE Journal, vol. 88, No. 71, "A New System for Synchronizing Magnetic Tape and Magnetic Film Transports for Television Post Production" Swetland, pp. 483-485, Jul. 1979.

*Primary Examiner*—Jerry Smith
*Assistant Examiner*—Steven R. Garland
*Attorney, Agent, or Firm*—John J. Mulrooney

[57] ABSTRACT

A video transcript retriever includes a control unit, a control interface, a tape unit and a display unit. The control unit includes a control computer having a software package consisting of control software, text software and edit software. The control software has the capacity to permit simultaneous operation of both the test software, which is capable of storing and searching voluminous documents, and the edit software, which has the capacity to operate the tape unit with precision. The text software is capable of performing a search function that at any time can provide the exact location of a specific passage within the searched document in terms of page and line. The edit software has the capacity to provide at any time the timecode number prerecorded on the videotape that corresponds to a specific passage. The process for locating and retrieving specific information on a videotape includes the steps of striping the videotape by assigning a numerical address for every one-thirtieth (1/30) of a second segment of the videotape; indexing the words written in a computer transcript to the words spoken on the videotape by assigning a timecode number to both the computer transcript and the videotape segment where each question/answer passage begins; and instructing the tape unit to shuttle to a precise tape location determined by the timecode numerical address located during the search of the computer transcript.

3 Claims, 3 Drawing Sheets

FIG. 4B

```
 1
 2
 3
 4        62
 5
 6   Q:  Is it the Insurer's position that there is no
 7       coverage under the Fidelity Bond insurance
 8       contract because Section 12 was operational?
 9
10   A:  We believe that Section 12 is operational insofar
11       as this claim is concerned because we believe that
12       information came to the attention of the Bank as
13       early as June 1, 1985 which indicated the
14   ▬   dishonest bank officer had committed a dishonest
15       or fraudulent act.
16
17
...
30
```

Page 490

1

VIDEO TRANSCRIPT RETRIEVER

BACKGROUND OF THE INVENTION

1. Field of the Invention

The present invention relates to a process and apparatus for retrieving and displaying information on videotapes and, more particularly, to a process and apparatus for quickly and precisely retrieving and displaying specific images and testimony in a videotaped deposition by indexing a computer-generated transcript of the deposition proceedings with a video timecode number address on the videotape.

2. Description of the Prior Art

In the field of litigation, a deposition is a proceeding in which an attorney asks oral questions of a witness, and a word-for-word record of the questions asked and the answers given is called the deposition transcript. Historically, a deposition was recorded by a stenographer so that the only record comprised a written transcript of the questions and answers. However, recent trends, particularly in major and/or complex litigation cases, is to videotape depositions so that the deposition record comprises a videotape along with the customary written transcript.

From time to time during the trial of a lawsuit, it becomes necessary or desirable to present to the court and/or jury a specific part of a deposition. Historically, when the record of the deposition comprised only a written transcript, reference to the specific part of the deposition was made by referring to the appropriate page and line of the written transcript and reading that particular part of the deposition. However, when the deposition has been videotaped, and the deposition is being used to impeach, or to expose an inconsistency between a witness, deposition and trial testimony, it is highly desirable to let the court and jury view and hear the witness, prior inconsistent testimony. Prior to the present invention, attorneys have been reluctant to use video depositions to impeach witnesses because the act of locating a specific part of the witness, testimony was a game of hit and miss involving use of the video recorder's fast-forward and fast-rewind controls to locate the impeaching testimony. In addition to being a boring and time-consuming process, this prior practice involved an inherent danger in that it was an inexact process that was performed in the presence of the jury so that if some objectionable or inadmissible testimony by the witness was inadvertently played for the jury, the attorney risked having his judgment overturned or being involved in a long and costly appeal. Also, many complex and/or major litigation cases involve the taking of numerous depositions, many of which require the use of several video tapes and fill hundreds of pages of recorded transcripts. Consequently, such a hit and miss process for locating specific parts of videotaped deposition testimony was highly impractical and unworkable.

While videotape retrieval systems are known, and videotape technology has been applied in many fields of use, no successful attempt has been made to adapt videotape technology to the field of litigation. The successful adaptation of videotape technology to the litigation field requires that the video information be precisely indexed and that the system have the capacity to quickly and precisely access specific deposition testimony occurring anywhere in the deposition without prior programming (preselection) of the access locations.

Prior video retrieval systems require the user to preprogram a limited number of deposition passages onto the tape or laser disk for later presentation. If the laser disk or tape is for courtroom use, this is unacceptable because the attorney has no flexibility to use deposition segments other than those pre-recorded on the laser disk or tape. However, an attorney rarely knows in advance whether it will be necessary to impeach a witness at trial with a prior inconsistent statement, or exactly what part or parts of a deposition transcript will be necessary and useful for impeachment purposes.

Accordingly, it is highly desirable to have a process and an apparatus capable of quickly and selectively presenting any deposition part, i.e., any particular question and answer, from any part of a videotaped deposition.

Examples of prior art video systems are U.S. Pat. No. 4,600,989 which discloses a video system capable of accessing specific tape locations, but not capable of accessing specific recorded data. Also, this system lacks precision in that it is designed to display information appearing for approximately one-half a second before a desired frame. U.S. Pat. No. 4,634,386 discloses a video teaching system which limits the user to a specific number of preselected tape locations, rather than providing the user with the capacity to structure a presentation including as many of the videotape segments as desired. U.S. Pat. No. 4,831,367 discloses a video information presentation system which only identifies tape locations, but has no capacity to search the contents of the videotape to allow the user to determine which tape locations shall be accessed. U.S. Pat. No. 4,641,203 discloses a video recorder and computer system combination in which each component records and displays where related information is stored in its own mechanism as well as in its counterpart mechanism. This system is simply a means of storing various types of images onto a videotape and keeping a record of the image locations on a computer connected to the videotape recorder. The system does no anticipate video applications such as depositions where the images will remain static and audio track will have to be indexed to a transcript of the proceedings. In the legal arena, it is quick access to a specific word or passage location that determines a system's usefulness, rather than the ability to locate a visual image. U.S. Pat. No. 4,924,387 discloses a system by which a stenographer can control a video camera so that one stenographer can stenographically record a deposition while simultaneously operating a video camera and recorder from the stenographer's work station. This system's main objective is to provide a system to accurately record a deposition and not to precisely locate and present specific passage of the videotape deposition.

OBJECTS AND SUMMARY OF THE INVENTION

Accordingly, it is an object of the present invention to provide a video retrieval process and apparatus which avoids the above-mentioned problems of the prior art.

It is another object of the present invention to provide a video information retriever which provides the user with the capacity to access any information on the videotape.

It is another object of the present invention to provide a video transcript retriever process and apparatus for use in litigation.

It is another object of the present invention to provide a video transcript retriever having the capacity to allow the selective replay of precise information in a pre-recorded videotaped program.

It is another object of the present invention to provide a video transcript retriever process and apparatus having the capacity to correlate a computer transcript of a deposition with the deposition videotape to allow selective, exclusive presentation of any deposition question and answer from any part of the videotape.

To provide the preceding objects and others, a video transcript retriever process and apparatus according to the present invention includes a video cassette recorder/player, a control computer, a video timecode generator/reader, a video monitor, a computer monitor, software controlling the timecode generator/reader and the video cassette recorder/player, and software containing the deposition transcript. Starting with a videotaped deposition, a control signal from the timecode generator/reader is recorded onto the videotape. The software controlling the timecode generator/reader and the video cassette recorder/player may or may not be used to aid in the recording of this control signal onto the videotape. The timecode control track assigns a numerical address or designation to each segment of the videotape. Once the control track has been recorded on the videotape, the numerical designation for each segment of the tape corresponding to the beginning of each deposition question is transferred from the software controlling the timecode generator/reader and video cassette recorder/player to the software containing the deposition transcript and correlated therewith. To display a specific question and answer on the videotape the computer generated transcript of the deposition is searched for the key words of the desired question and answer. Once the desired question and answer of the transcript to be displayed is located on the software containing the deposition, the timecode number corresponding to the desired question is transferred from the software containing the deposition transcript to the software controlling the video cassette recorder/player, and the desired videotape part is located and displayed.

BRIEF DESCRIPTION OF THE DRAWINGS

FIG. 4B shows the format of a question and answer as it appears in a computer-generated transcript, including information location in terms of page and line and timecode address.

DESCRIPTION OF THE PREFERRED EMBODIMENT

Figure 1:
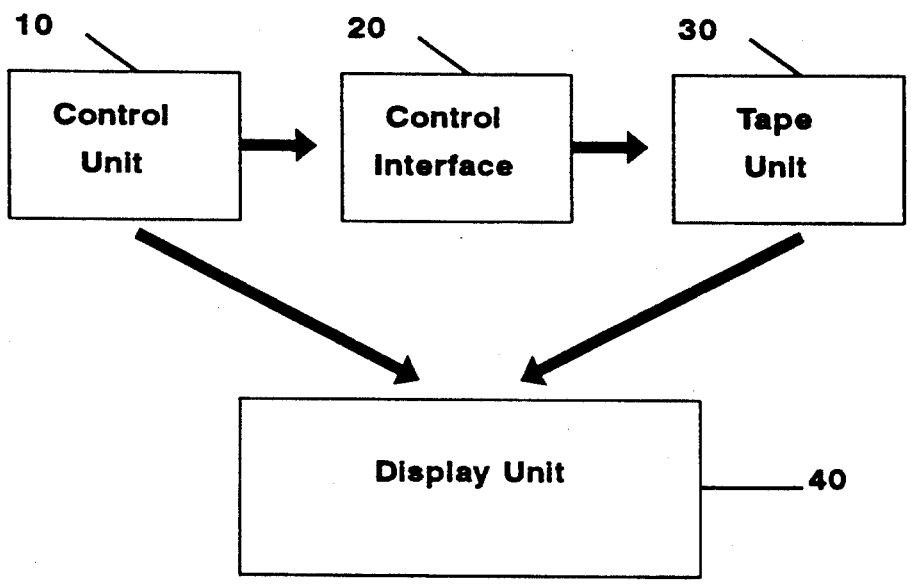
FIG. 1 is a block diagram showing the logic components of the video transcript retriever process and apparatus according to the present invention.

The video transcript retriever apparatus is shown in block diagram in FIG. 1 and consists of 4 operating subsystems including a control unit 10, a control interface 20, a tape unit 30, and a display unit 40. The control unit 10 comprises a personal computer and customized software, and provides the capability of performing text searches throughout the deposition transcript and controlling the operation of the tape unit 30. The control interface 20 comprises a commercially available video deck controller which functions to translate the request signals from the control unit 10 into signals understandable to the tape unit 30. The tape unit 30 comprises a videotape recorder/player which functions to record or play information on the videotape. The display unit 40 comprises 2 monitors which serve to display the computer output and the videotape output.

Control Unit Software

Figure 2:
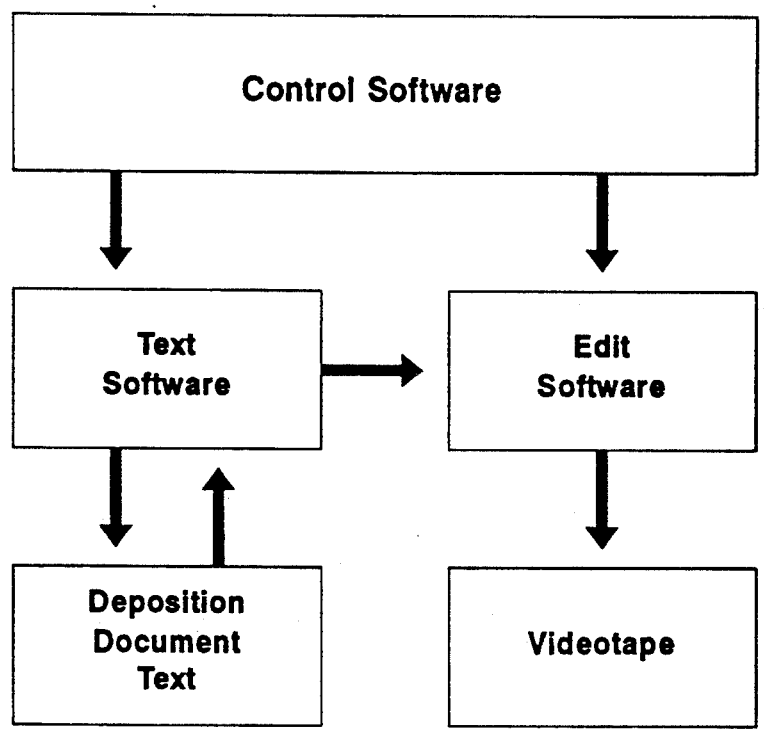
FIG. 2 is a software block diagram of the video transcript retriever.

The control unit 10 includes a software package (FIG. 2) consisting of Control Software, Text Software and Edit Software. From the logical standpoint, in normal operation mode, the computer is simultaneously running all three pieces of software. Each software has certain characteristics which enables their cooperation and makes system integration possible.

The Control Software has the capacity to supervise the other two softwares. In operation, the Control Software constitutes a multi-program environment under which multiple programs can be run simultaneously without knowing or affecting each other. Because the system must have the capacity to rapidly access and search the written testimony to locate and decide which video images to display, and to display such video images, the system must allow the simultaneous operation of the Text Software involving the storing and searching of voluminous documents and the Edit Software involving the precise operation of the tape unit 30.

The Text Software must have the capability of rapidly searching large text documents. Ideally, the Text Software will provide many sophisticated methods of searching through large text documents and many sophisticated methods of specifying the object of the search because, in applying video retrieval methods to litigation situations, it can never be anticipated which of literally hundreds of thousands of statements included in numerous depositions will become crucial.

The Edit Software has the capability of controlling the tap unit 30, and functions together with the Control Interface 20 to permit operation of the tape unit 30 with extreme precision, i.e., to permit movement of the videotape to within 1/30 of a second of the desired testimony. The capacity to start an information presentation within 1/30 of a second of the precise location of that information on a videotape essentially eliminates the presentation of extraneous information.

Control Unit Software Integration

The operational features which the video transcript retriever requires are not found in a single software. Thus, a multi-program software environment consisting of the Control Software, Text Software and Edit Software is necessary to provide all of the desired system features. Each of the software selected has certain characteristics which enable them to cooperate in creating an integrated operational environment. The Control Software permits the transfer of display data from one program to another, and provides the system capability of viewing at least a portion of the deposition transcript while operating the tape unit 30 via the Edit Software. The Text Software at any time can provide the exact location of specific testimony within the searched document in terms of page number and line number and the timecode numerical address corresponding thereto. In a litigation situation, this is very important because, while a retrieval system could be devised simply to note the tape location of certain key words, such a system would not establish the testimony location relative to other testimony with the degree of certainty and precision required. For example, often a deposition text search will reveal several passages containing the same key words. If the attorney does not know exactly which passage to refer to, all of the possible choices must be reviewed. However, if the system is capable of referring to the testimony by page and line number, this allows the attorney the feature of relative time references. Usually, the attorney will know that the desired passage occurred before or after another passage which has just been read. In that event, the page and line location of the recently reviewed passage serves as a starting point for the text search. In complex litigation searches it is highly desirable to have as many reference points and indexing methods as possible available to help the user rapidly search through the hundreds of thousands of questions and answers included in the many deposition transcripts/videotapes. In effect, such additional reference points for testimony permit the user to triangulate the location of the desired testimony.

The Edit Software has the capacity to read the timecode number addresses pre-recorded on the videotape, and this feature permits the user to build a simple database file in which the videotape's timecode number can be treated as the primary key. This permits generation of a database in which the primary key (the timecode number) is indexed to the page and line location of the testimony as well as to the first portion (key words) of every question. Because the Edit Software is incapable of both importing the entire transcript deposition and performing the advanced text search application of the Text Software, only a portion of each question and answer exchange will be available in the Edit Software display Thus, if the page and line location of a particular question and answer exchange are known, the timecode number for that particular testimony will be readable, even if the desired testimony appears beyond the end point of the Edit Software's limited database entry for that testimony. Once such a database file is built, the primary key can be accessed via the page and line location of the words contained in the database entry reflecting the first portion of each question. A simple search feature allows for single key word searches.

Data Preparation

The video transcript retriever data set consists of two logical files: a Text File formatted for use with the Text Software and an Edit Database File formatted for use with the Edit Software. The Text File and the Edit Database File are prepared according to the following steps:

1. A raw ASCII document containing the deposition transcript taken by the stenographer from the source videotape is formatted for use with the Text Software;
2. A Text File is created which reflects the Text Software's image of the loaded document after formatting;
3. The Edit Database File is created based on the Text File contents. This process involves reading the Text File, finding the text references constituting selected key phrases and recording such key phrases in the comments part of the Edit Database along with the page and line location and the timecode numerical address of such key phrases within the document. Finally, a search is conducted for such page and line references. The selected key phrases will simply be the first few words of each question and answer passage, or a single key word within a question and/or answer;
4. A timecode address is recorded on the source tape containing the videotaped deposition corresponding to the original ASCII document;
5. In the event that several two-hour videotapes are required to store the video images corresponding to the Text File, the Edit Database containing the page and line locations and the key phrases must be divided into smaller files corresponding to each tape, so each videotape will have a separate database; and
6. Using the Edit Software, the Edit Database File is stamped with the timecode corresponding to the comment entries.

System Operational Modes

Figure 3:
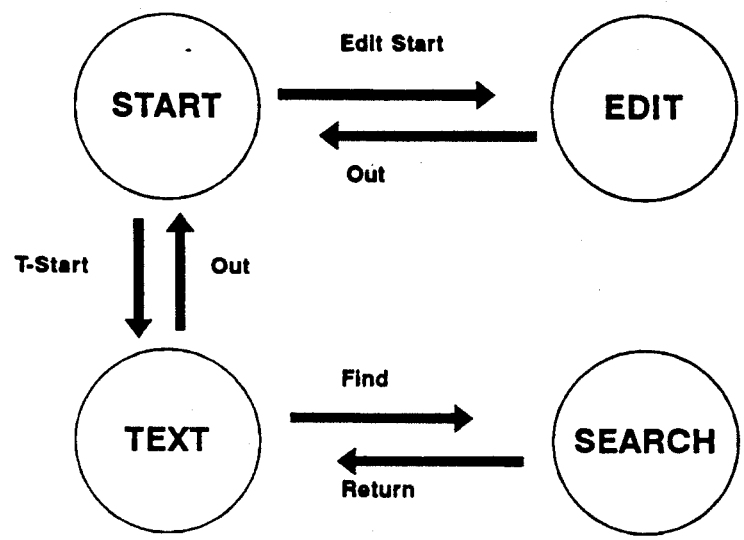
FIG. 3 is a flow chart of the video transcript retriever operating modes.

Referring to FIG. 3, the video transcript retriever at any time operates in one of the following modes:

1. A start mode provides the operating environment similar to PC-DOS. In order to continue operation, the system processes have to be started and data sets have to be selected.
2. A text mode provides the system with the capability to perform sophisticated searches/retrievals of the information from the subject document. This is the default mode.
3. The edit mode permits control of the tape unit 30. In this mode, the system behavior closely resembles a videotape edit system with many customized features.
4. The search mode is very similar to the edit mode with the exception that it is treated as an interruption initiated from the text mode. The search mode is addressed separately because it is activated while the user is also actively operating in the edit mode, even through the search mode operations are identical to the edit mode operations. In the search mode the user exits the edit mode while it is running and looks at the entire transcript displayed in the Text Software. Once the transcript has been displayed using the Text Software, the same software is used to initiate text searches. Once the location of the passage has been found, the search mode finds and displays the corresponding videotape segment. Usually the search mode is canceled after playing the appropriate tape passage.

After the initial startup decisions concerning the selection of the text/video program to be processed, the video transcript retriever system is put in the Text Mode, and from there on, a typical dialogue might be as follows:

| User Action | System Mode |
| --- | --- |
| Searches text | TEXT |
| Retrieves information | TEXT |
| Finds next passage | SEARCH |
| Decides to issue the find command in order to display the corresponding video program | |
| System positions the tape and gets ready to EDIT | SEARCH |
| Plays, pauses, rewinds or forwards the tape | SEARCH |
| Decides to resume the text search | SEARCH |

| User Action | System Mode |
|---|---|
| Searches text | TEXT |
| Retrieves information | TEXT |

Operation

Considering operation of the system generally, the user works with the Text Software in the Text Mode to locate the desired passage of a document, and then issues the Find command. The Find command initiates the Control Software which takes over operation of the system, suspends the execution of the Text Software, activates the Edit Software and registers/displays the page and line location of the current text. Next, the Control Software initiates the Edit Database search for the comment entry corresponding to the page and line location reference found from the Text software. If such a reference is found, the tape deck is sent to the corresponding timecode location and is placed in Pause Mode. At this point, the user can activate play or any other function. When the presentation of the tape images is completed, the Control Software suspends the Edit Software and reactivates the Text Software at the point where it left off, i.e., upon the Find command.

Considering operation of the video transcript retriever more specifically, the software/hardware environment is integrated into the following steps of litigation and preparation:

1. The deposition is recorded by stenographers and/or videographers. The end product of this deposition step will be a videotape (FIG. 4A) of the proceedings, a written transcript (not shown), and a computer-generated transcript (FIG. 4B) on an ASCII file.

Figure 4A:
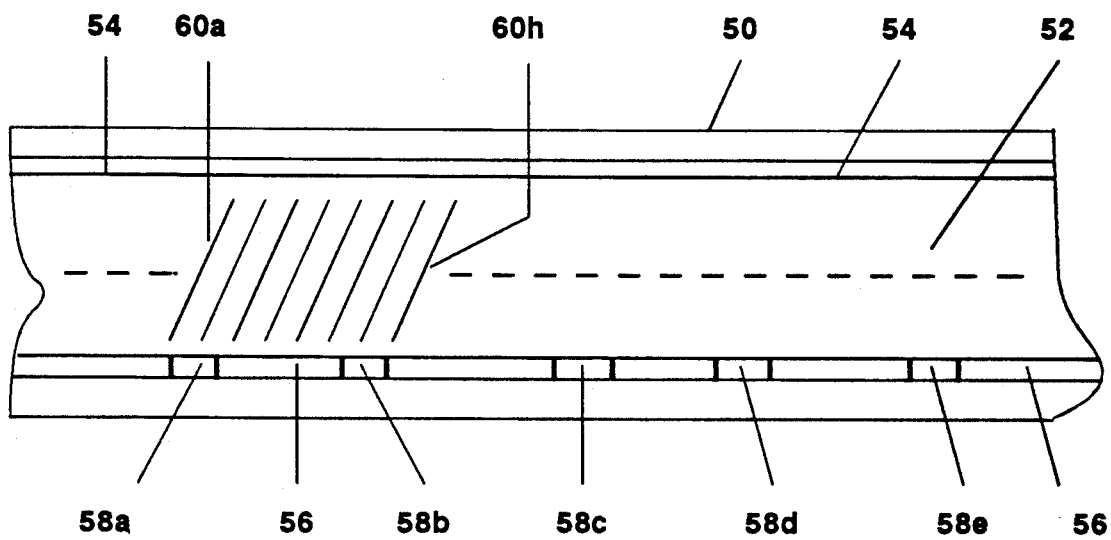
FIG. 4A shows the format of the video signals and the timecode numerical address on a videotape.

Referring to FIG. 4A, the numeral 50 generally refers to a portion of the videotape which includes a video track 52, an audio track 54, and a timecode control track 56 on which the timecode numerical address signals 58 are striped at intervals of each 1/30 of a second along the videotape 50. Five such address control signals are shown in FIG. 4A and are designated 58a, 58b, 58c, 58d and 58e.

The video signals on the video track 50 are graphically illustrated by skew video tracks 60a-60h. The eight skew video tracks illustrated in FIG. 4A correspond to the eight lines of the question and answer illustrated in FIG. 4B. The first line of the question which appears at line 10 on page 490 of the computer-generated transcript corresponds to the timecode numerical address 58a on the control track 56 of the videotape 50 which might be, for example, 01:26:12:02.

Referring to FIG. 4B, there is graphically illustrated the question and answer which begin at line 10 of page 490 of a computer-generated transcript of a videotaped deposition. The timecode numerical address of 01:26:12:02 which marks the beginning of the question on the videotape 50 also appears on the computer transcript at 62.

The key phrase for a data base preparation and search will be "Section 12". This key word will be assigned the timecode numerical address of 01:26:12:02 which is the numerical address which is closest to the location of the start of the question in which the key phrase appears on the videotape 50.

2. After the deposition has been recorded, the videotape 50 must be striped with the timecode numerical addresses 58a through 58e. This process produces a signal on the videotape that assigns a numerical address for every 1/30 of a second segment of the videotape.

3. Using the control unit 10, the control interface 20, the tape unit 30 and the display unit 40, the operator indexes the words from the transcript to the words spoken on the videotape by assigning a timecode number, e.g., 01:26:12:02, to the videotape segment, e.g., 60a, where each question and answer segment begins. The system can be customized to segment the testimony into different groupings such as "questions" and "answers". This phase ends when all of the testimony segments have been indexed to videotape address codes.

4. The final step or presentation phase is accomplished by identifying the testimony's specific videotape address using the text, search and edit modes, whereupon the operator presents the desired information on the display unit.

The Computer Program

The program appended to this specification represents the Control Software which creates an environment in which the Text Software and Edit Software function. The Text and Edit Software are both commercially available. An example of the Text Software is Discovery 3.01 by Data Dynamics, Inc. An example of the Edit Software is Logmaster 1.4 by Comprehensive Video Supply Corporation.

It will thus be seen that the objects set forth above among those made apparent from the preceding description, are efficiently attained and, since certain changes may be made in the above system, apparatus, process, articles and programs without departing from the scope of the invention, it is intended that all matter contained in the above description are shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall there between.

What is claimed is:

1. A system for indexing written and video records of a deposition comprising:
    a control unit having a control computer including a software package consisting of a text software having the capacity to store and search documents, an edit software having the capacity to operate a tape unit with precision, and a control software having the capacity to control said system and permit the simultaneous operation of said text software and said edit software;
    a videotape having video and audio information thereon;
    a document consisting of said audio information in a written record format stored in said test software;
    a control interface connected to said control unit to receive signals from said control unit and pass signals to a tape unit;
    a tape unit having said videotape thereon and connected to said control interface to receive signals therefrom;
    a numerical timecode address assigned to said videotape for every 1/30 of a second segment of said videotape;
    an identical numerical timecode address assigned to each audio information segment in said document corresponding to the identical audio information segment on said videotape; and a display unit connected to receive signals from said control unit and from said tape unit for selectively displaying the audio and video information at any numerical address on said videotape.

2. A process for indexing each question and answer segment on a videotape deposition to each corresponding question and answer segment on a written record document of said deposition comprising:

listening to the audio information on said videotape while simultaneously reading a written record of said deposition;

marking the beginning of each question and answer segment of said deposition on said videotape with a numerical timecode address;

sending said timecode addresses which identify the beginning of each question and answer segment on said videotape through a control interface to a control unit; and placing at the beginning of each question and answer segment of said written record of said disposition an identical numerical timecode address corresponding to the numerical timecode address previously assigned to each question and answer segment appearing on said videotape by means of a command generated in said control unit and passing through said control interface.

3. A process for retrieving and displaying video and audio information on a videotape comprising the steps of:

providing a written record document of the spoken words appearing on said videotape in question and answer segments;

indexing the words written in said record to the identical words spoken on said videotape by assigning a timecode numerical address for each question and answer segment on said written record corresponding to the identical question and answer segment on said videotape;

searching said written record to locate a specific word passage and the timecode numerical address assigned thereto;

instructing a tape unit to shuttle said videotape to the precise tape location as determined by the timecode numerical address located in said written record; and displaying the information on said videotape located at said timecode numerical address.

* * * * *